Feb. 14, 1939.　　　T. G. CHAPMAN　　　2,147,009
CYANIDATION
Original Filed Dec. 14, 1935　　2 Sheets-Sheet 2

INVENTOR.
THOMAS G. CHAPMAN
BY
ATTORNEY.

Patented Feb. 14, 1939

2,147,009

UNITED STATES PATENT OFFICE 2,147,009

CYANIDATION

Thomas G. Chapman, Tucson, Ariz.

Application December 14, 1935, Serial No. 54,363
Renewed December 31, 1937

18 Claims. (Cl. 75—2)

This invention relates to the cyaniding of ores such as gold bearing ores and more particularly to that part of cyanidation that involves the recovery of gold from cyanide solution, which is usually referred to as the precipitation step. The present application is a continuation in part of my application for Cyanide process of recovering gold and silver from their ores, Serial No. 755,249, filed November 28, 1934.

One object of this invention is to maintain the cyanide solution at all times at the maximum degree of metal dissolving or leaching power, and thus to make possible the cheaper and more efficient recovery of values from ore by cyanidation.

Another object is to provide a method of procedure, according to this process, whereby the above aim is effectually realized.

Still another object is to provide a system for carrying out the process which can be operated in a continuous or intermittent manner and which will effect a substantial saving of time, equipment, power and materials commonly necessary in former cyanidation practice.

The invention involves the substantially simultaneous dissolving of gold by cyanide solution and the deposition of this dissolved gold upon charcoal or other suitable carbonaceous material. The gold-solvent cyanide leaches the gold from the ore, whereupon the leached-out gold is molecularly dispersed; that is, it is in liquid phase. The transformation into liquid phase is effected in the presence of charcoal so that, immediately thereupon, the gold in liquid phase is selectively extracted from the other substances present, irrespective of whether they are in liquid or solid phase, by virtue of the fact that the gold is adsorbed by or on the charcoal particles. To that end, charcoal may be added to the ore ahead of, in, or after the grinding mill, just as long as there is present in one place (1) ore to be leached, (2) a leaching reagent such as cyanide, and (3) a source of finely divided carbon, such as charcoal. After this concurrent or concomitant dissolving and adsorption, the charcoal particles with their burden of gold are removed from the liquid medium, preferably by flotation, or by filtration, or even by sedimentation, following which removal the gold can be recovered in solid phase by any suitable method, such as by incineration of the charcoal. A marked advantage of this procedure is that by forthwith adsorbing the gold on the charcoal at the time the gold goes into liquid phase, the gold-leaching cyanide solvent is maintained essentially barren of dissolved gold, which means that its gold leaching and dissolving avidity is never substantially satiated or appeased.

In present cyanide practice, it is customary to use a comparatively thin pulp in order to avoid over-concentration of gold in the cyanide solution and consequent slowing up of the dissolving process. In this process, however, since the cyanide solution is always essentially free of gold, it is possible and desirable to use a comparatively thick pulp, thus introducing substantial economies. It is, furthermore, evident that, using a given weight of charcoal per tone of ore, there will be a larger proportion of charcoal present in a thick pulp than in a thin one, thus facilitating and hastening the adsorption of the gold by the charcoal and tending to keep the solution free of gold.

The dissolving of the gold and its so-called precipitation on charcoal, which is in reality adsorption or sorption, are normally considered to be opposing processes, so it is rather surprising to find that these two phenomena can be carried out to advantage concurrently, at the same time and in the same place. Yet that is the paramount feature of this invention.

When gold is leached or dissolved from its ore by a gold solvent, such as cyanide, it takes the form of gold in liquid phase, which under such conditions is believed to be in the form of a gold salt. The charcoal present seems to have the property of selecting out and attaching to itself, by adsorption, the dissolved gold salt in preference to the non-gold salts or other liquid or solid phase materials present. The gold adsorbed by the carbon is not in metallic form, so true precipitation does not take place. Adsorption takes place, probably with some chemical change in the gold salt after the latter is adsorbed. Any chemical action that may occur between the gold salt and the carbon or some ingredient of the charcoal, such as calcium oxide or carbon monoxide, does not affect the process.

This process can be satisfactorily and economically applied to the treatment of gold ores. Such ores often contain silver. This process is not as effective with silver as it is with gold, so it may be true that any silver present that is not adsorbed by the charcoal may be recovered subsequently by other recovery methods. The process is, however, generally applicable to any ores from which gold is to be recovered by means of cyanide.

The concurrent or concomitant dissolving and adsorption of gold tends to leave the cyanide solution in a substantially barren condition in that it rarely contains more than 0.03 ounce of gold per ton at any time and contains almost no gold when adsorption is completed. This result is attained because, essentially, as fast as the gold is dissolved by the cyanide solution, it is immediately removed from the solution by the charcoal; and, having a substantially barren solution of cyanide present at all times, the dissolving power of the cyanide on the gold is continuously maintained at maximum efficiency, a condition long sought when dissolving gold in cyanide solution. To that end, this process can be practiced by having charcoal present during the leaching out of gold from its ore by the cyanide. Preferably, this is accomplished by having the charcoal present in the grinding mill at the time that the ore is being ground in cyanide solution.

The mixture discharging from the mill, comprising ore, cyanide, and charcoal, is fed to an agitator where the dissolving and adsorption processes are stimulated by the agitation of the mixture. After dissolving and adsorption have concurrently progressed to economically substantial equilibrium, the mixture is continuously or intermittently removed from the agitator and sent to flotation cells where the charcoal with the gold salt carried by it is removed from the other components of the mixture, whereupon the gold is recovered from the charcoal by some process such as by burning. The mill for fine grinding is in the usual closed circuit arrangement with a classifier.

In order to maintain a substantially constant proportion of charcoal in the pulp mixture, some of the pulp mixture from the agitator may be re-circulated to the grinding mill or classifier, but, if recirculated to the grinding mill, it is desirable to thicken the mixture after it is taken from the agitator and before it goes to the mill because it is desirable to maintain a fairly thick pulp in the grinding mill. Lime is, of course, added to the mill as is usual in cyaniding processes.

This process results in a high recovery of gold from its ore at an economically attractive cost so the process is not only unusually effective, but the cost of installing a plant to treat any given tonnage is unusually low and the cost of operation is less than when other cyanide processes are used. The plant cost is reduced when this process is used because the time of agitation usual in cyanide processes is materially decreased so less agitators need be used per unit of volume of pulp handled. Again, the entire pulp filtration stage or step usual in cyanide processes can be completely eliminated by using this process because the cyanide solution is substantially barren of gold and the cyanide solution used is so weak that it can be wasted with no more loss of cyanide than takes place in current cyanide operations.

The concurrent dissolving of the gold and its adsorption by the charcoal makes it possible to take advantage of certain physical laws, among which is the law of mass action. It is well known that, when a solid is to be dissolved in a solvent, the power of the solvent diminishes in proportion to the amount of solid dissolved. In the present day process, therefore, in which gold is leached from its ores and substantially all dissolved in cyanide solution before the pregnant solution is exposed to a precipitant, the solvent action of the cyanide on the gold progressively diminishes, but, in this process, in which dissolving is followed immediately by adsorption essentially as fast as dissolving takes place, the undissolved gold is always exposed to a substantially barren cyanide solution, which means that the solvent action of the cyanide present is continuously maintained at its maximum efficiency.

Another feature of this process is the discovery that the approximate equilibrium ratio, between the gold in solution, but not adsorbed by charcoal, and the gold that is adsorbed by the charcoal is very small and this fact results in a very high recovery of gold from solution by the charcoal. For example, if an attempt were made to dissolve gold by means of a cyanide solution and concurrently precipitate the dissolved gold by metallic zinc, the gold so precipitated by the zinc would re-dissolve until approximate equilibrium was reached and there was attained a certain relationship or balance between the amount of precipitated gold present in the pulp and the amount of dissolved gold present. It is generally known that the approximate equilibrium ratio between gold precipitated by zinc in the presence of free cyanide and dissolved gold not precipitated is such that a large proportion of the precipitated gold redissolves unless considerable excess zinc is present and maintained. In the case of the process herein described, charcoal is used rather than zinc and has a property not possessed by zinc, namely, the power of adsorbing the gold salt from the solution. Although approximate equilibrium must also be reached by the use of charcoal in that a balance is reached between the amount of the gold salt not adsorbed by the charcoal and the amount of gold salt adsorbed by the charcoal, one of the features of this invention is the discovery that, in the case of gold salt adsorption by charcoal, the approximate equilibrium ratio is so low that practically complete adsorption of the gold salt into the charcoal is possible and feasible even in the presence of the continuing and usually opposing action of the free cyanide present.

Flow-sheets of equipment are diagrammatically illustrated in the accompanying drawings as examples of how the process of this invention may be practiced, and of how apparatus assemblies embodying this invention may be placed in operative relationship.

Figure 1:
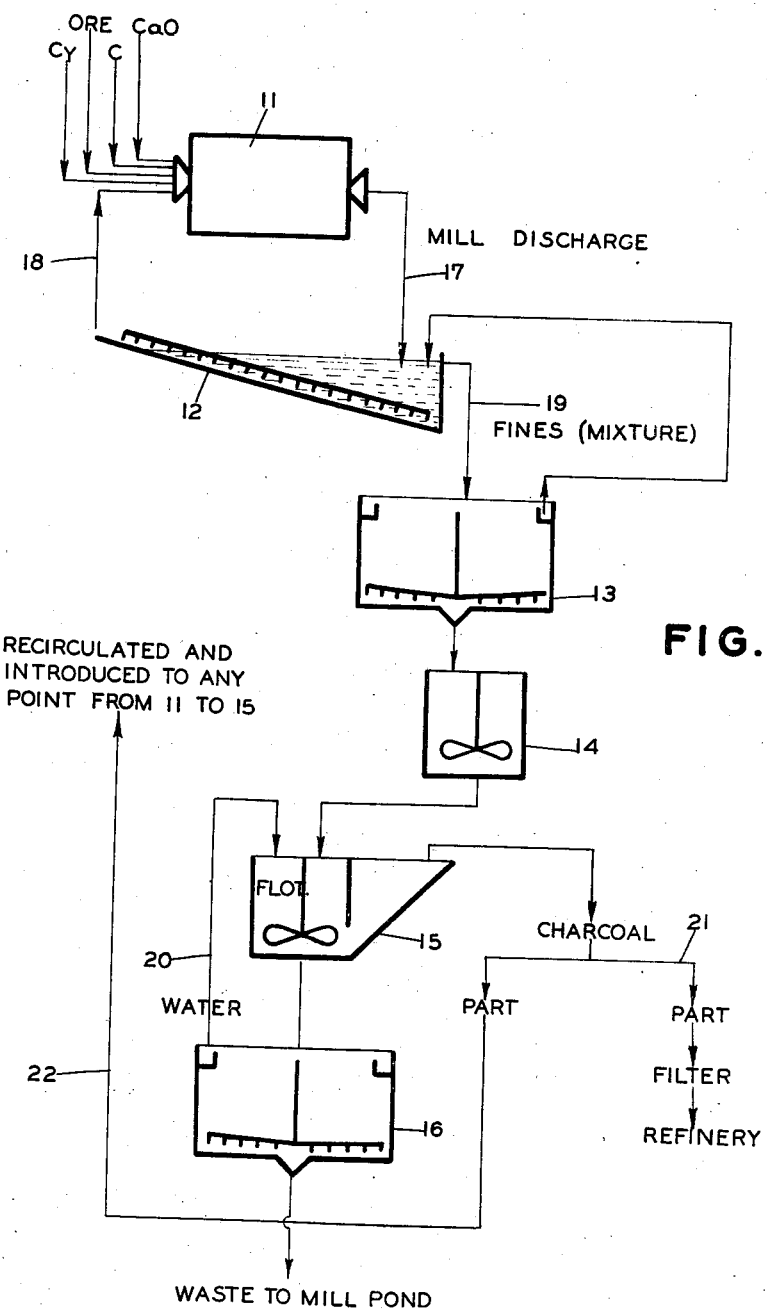
Fig. 1 is a flow-sheet wherein there is illustrated diagrammatically an assembly of apparatus for practicing the process of this invention and in which there is employed a single stage of charcoal circulation.

Referring to Fig. 1, which shows an assembly of apparatus particularly applicable in treating low grade ores, the numeral 11 represents a balance or load mill or other mill suitable for grinding ore having connected therewith, usually in closed circuit arrangement, a classifier 12. The overflowed fines from the classifier go to a thickener 13 and the thickened pulp therefrom to an agitator 14, which in turn is connected with some carbon separating device which in this flow-sheet is shown to be a flotation cell 15. The concentrate of the flotation cell 15 is filtered and the charcoal so produced goes to the refinery or part of the concentrate may be recirculated to the process as hereafter described. The tailing pulp of the flotation cell may be discarded as waste or treated for the recovery of water in thickener 16.

To the grinding mill 11 is fed the ore to be ground with the usual mixture of cyanide solution or of other gold solvent, plus also the usual amount of lime or other alkaline compound. This mixture is finely ground in the mill. Discharge 17 from the mill is conveyed to the classifier 12 from which the classified fines overflow, and the coarse sands are returned to the mill through a suitable connection 18. A suitable source of carbon satisfactorily provided by charcoal, although activated charcoal seems preferable, is added to this circuit in such a way that, when the gold solvent cyanide leaches the gold from its ore and converts the gold into liquid phase material, there is present during this action the charcoal. To this end, the charcoal may be mixed with the cyanide solution that is fed to the mill; the charcoal may be fed to the mill; the charcoal may be fed to the discharge 17; or it may be fed to the classifier 12, or even to the classifier sand return 18, the essential point being that the dissolution of the gold takes place in the presence of charcoal, or other solid carbonaceous material having absorbtive affinity for gold in liquid phase.

The fines 19 flow from the classifier 12 into a thickener 13, the thickened pulp therefrom passing to an agitator or agitating stage 14 where the dissolution of the gold and its forthwith adsorption by the carbon progresses to essential completion. The mixture is then conveyed to the flotation cell or carbon separating stage 15 where the carbon or charcoal particles with their load or burden of gold material are removed from the liquid carrier or menstruum. The carbon particles thus separated with their gold load are then treated by known methods to solidify their gold content in any manner by which the gold can be recovered, such as by burning them. The menstruum remaining after the carbon with its gold load is separated therefrom can at times advantageously be treated in a thickening stage, such as by the thickener 16. For this operation the effluent 20 is decanted off for the purpose of returning for re-use a part of the water formerly mixed with the solids discharged from the flotation cell. The decanting of part of the liquid results in a thickening of the remaining sludge or pulp taken as underflow from the thickener and discarded from the mill as waste material. In line with customary present mill practice the solids of this waste sludge may be settled in ponds and clear water returned from the ponds to the mill for re-use. Incidentally the return of mill water to the process either from the overflow of the thickener 16 or from a mill pond permits the capture of any carbon particles with gold adsorbed thereon which may have escaped the separating action in the flotation cell 15. From this flow-sheet it will be observed that the gangue of the gold ore is not necessarily removed prior to precipitation or adsorption of the gold in liquid phase upon the charcoal since one of the features of this invention is the discovery that charcoal and particularly activated carbon is capable of selectively adsorbing gold in liquid phase from a mixture containing other materials in both liquid and solid phase.

As explained above, this process seems to work better when the pulp treated for the cyanide step is thick and of the nature of a slurry, so, to this end, it has been found satisfactory to use a pulp which is substantially 1:1 dilution and for the purpose of obtaining a pulp of 1:1 dilution it will usually be best to place a thickener between the classifier 12 and the agitator 14.

Another feature of this invention is the maintaining of a high concentration of charcoal or other adsorbent in the process without adding excessive amounts of new charcoal to the process. This is accomplished by dividing the charcoal recovered by the flotation machine 15 into two parts. One part 21 with its burden of gold is removed from the process for the recovery of its contained gold; the remaining part 22 is re-circulated to any point in the process from the grinding mill to the flotation machine for the purposes of first, maintaining a high concentration of charcoal without addition of all fresh charcoal, second, reducing the consumption of charcoal used in the process and, third, of building up a higher concentration of gold in the charcoal which in turn reduces the amount of charcoal ash to be handled in the refining operation.

Figure 2:
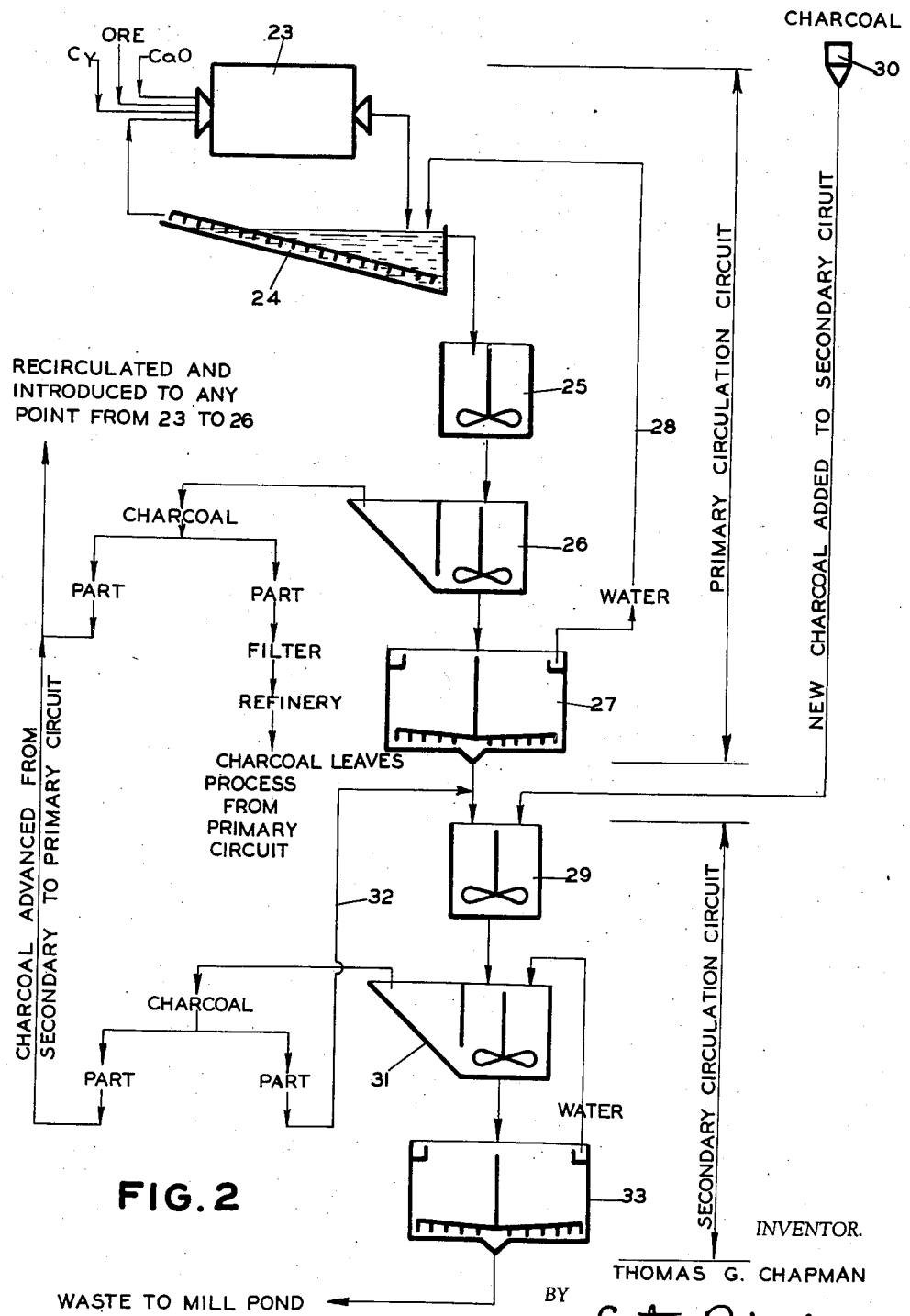
Fig. 2 is a flow-sheet wherein there is illustrated diagrammatically another assembly of apparatus for practicing the process of the present invention and in which there are employed two stages of charcoal circulation.

A modified form of apparatus assembly or system for carrying out the process of this invention is shown in Fig. 2 diagrammatically. The procedure according to the system illustrated in this figure is substantially the same as that outlined in Fig. 1 but provides for two stages or circuits of charcoal circulation and is particularly effective in the treatment of higher or average grade ores and high grade concentrates.

In this assembly the numeral 23 refers to a balance or load mill or other suitable ore grinding device communicating at its discharge end with a classifier 24 and usually in closed circuit arrangement therewith. The overflow fines from the classifier are passed to an agitator 25 which in turn is in communication with a carbon or charcoal separating device, in this instance shown to be a flotation cell 26. The concentrate of the flotation cell 26 passes therefrom and is filtered and the charcoal recovered thereby conducted to a refinery or other point for the separation of the gold from the charcoal, or a part of the charcoal or the concentrate may be returned to the system as described in connection with Fig. 1. The tailing pulp of the flotation cell 26 passes into a thickener 27 from which water may be returned to the system as along a path 28. As shown in Fig. 1 it might, of course, be desirable to provide a thickener in the circuit between the classifier 24 and the agitator 25.

The part of this system above described is substantially identical with that outlined and described in connection with Fig. 1 and is referred to as the primary circulation circuit and indicated as such on the drawings. The ore, cyanide solution and the usual amount of lime or other alkaline compound are fed to the grinding mill 23 and a suitable source of carbon is provided and the mixture passes through the primary circulation circuit in substantially the same manner as in Fig. 1. In this figure however, underflow from the thickener 27, instead of being discarded as waste material is conducted to an agitator 29. A suitable source of supply 30 of new carbonaceous material is provided and fresh charcoal is conducted from this source and introduced into the agitator 29 with the underflow from the thickener 27. A desirable period of agitation is allowed wherein the freshly added charcoal may combine with any gold material being dissolved or leached by the cyanide solution. The agitator 29 is in communication with a suitable carbon separating device, herein shown to be flotation cell 31 and the mixture from the agitator 29 is conducted thereto. The concentrate is taken from the flotation cell 31, split into two parts and one portion is returned to the system as along the path 32 and introduced into the agitator 29 together with the thickener underflow and the new charcoal. The other portion is combined with the recirculated material in the primary circuit and reintroduced to the system at any point from 23 to 26. The tailing of the flotation cell 31 is conducted to thickener 33, the effluent from which is conducted back to the flotation cell 31. The underflow from the thickener 33 is discharged as waste to a mill pond or otherwise disposed of.

That portion of the system or assembly shown in Fig. 2 and comprising the agitator 29, flotation cell 31, carbon supply 30 and thickener 33 is considered as a secondary circulation circuit and is indicated as such on the drawings. By further treating the underflow from thickener 27 with the addition of fresh charcoal and a second flotation step, it is assured that practically all of the gold content of the original ore material will be recovered and practically none left in the final discharge. The introduction of fresh charcoal from the source 30 and its recirculation in the secondary circuit together with the advance of a part thereof to a primary circuit results in a considerable saving in the amount of charcoal used and, as pointed out above, the two flotation stages will effectually prevent the escape of any but a very minute portion of recoverable material in the system. In the two stage operation, furthermore, the circulation of a substantial quantity of charcoal throughout both circuits of the system permits a greater concentration or building up of values in the charcoal with the result that the amount of charcoal ash to be handled in the final recovery of the values from the charcoal is substantially reduced.

I claim:

1. That step in the continuous cyanidation of gold bearing ore which comprises exposing the ore to cyanide solution to effect thereby an extraction of gold material from said ore and, while the ore is so exposed, having present charcoal by virtue of which the gold material as it is extracted from the ore by the cyanide solution is forthwith adsorbed by said charcoal with the result that the cyanide solution is continuously maintained substantially barren of gold.

2. The method of removing gold values from ore containing the same which comprises subjecting the ore to the action of a cyanide solution which at all times is maintained substantially free of dissolved gold values, said cyanide solution being maintained substantially free of dissolved gold by the presence of charcoal while the ore is being subjected to the action of said solution.

3. The method of treating gold bearing ore which comprises effecting a mixture of said ore together with charcoal, an alkali, and cyanide solution, agitating said mixture by virtue of which gold is extracted from the ore by said cyanide solution and is concurrently adsorbed by said charcoal with the result that a cyanide solution substantially free of dissolved gold is maintained in contact with said ore, and separating the charcoal with its burden of adsorbed gold by froth flotation.

4. The process of treating gold bearing ores which comprises effecting a mixture of said ores together with charcoal and cyanide solution, agitating said mixture by virtue of which gold is extracted from the ore by said cyanide solution and is concurrently adsorbed by said charcoal with the result that a cyanide solution substantially free of dissolved gold is maintained in contact with said ores, separating the charcoal with its burden of adsorbed gold, and returning a portion of the separated charcoal to the process.

5. In a process for the recovery of gold from its ores by cyanidation, the steps of agitating a mixture of gold bearing ore, an alkali, cyanide solution, and charcoal, while effecting a transfer of gold material from the ore to the charcoal, separating charcoal with its burden of gold material from said mixture, agitating a quantity of said separated mixture in the presence of additional charcoal for recovering gold material residual therein, separating charcoal therefrom, and returning said thus separated charcoal to the process at any point preceding the point of addition of said additional charcoal.

6. In a process for the recovery of gold from its ores by cyanidation, the steps of agitating a mixture of gold bearing ore, cyanide solution, and charcoal, while effecting a transfer of gold material from the ore to the charcoal, separating charcoal with its burden of gold material from said mixture, returning a quantity of the separated charcoal to the process, agitating a quantity of said separated mixture in the presence of additional charcoal for recovering gold material residual therein, separating charcoal therefrom, returning a quantity of said thus separated charcoal to the process at a point after said first separation step, and returning another quantity of said thus separated charcoal to the process at a point ahead of said first mentioned separation step.

7. In a process for the recovery of gold from its ores by cyanidation, the steps of agitating a mixture of gold bearing ore, cyanide solution, and charcoal, while effecting a transfer of gold material from the ore to the charcoal, separating charcoal with its burden of gold material from said mixture, returning a portion of the separated charcoal to the process, agitating a quantity of said separated mixture in the presence of additional charcoal for recovering gold material residual therein, separating charcoal therefrom, returning a quantity of said thus separated charcoal to said last mentioned agitation step, and returning a quantity of said thus separated charcoal to the process at a point ahead of said first mentioned separation step.

8. In a process for the recovery of gold values from its ores by cyanidation, the steps of agitating a mixture of ore, cyanide solution, and charcoal, while effecting a transfer of gold values from the ore to the charcoal, separating charcoal with its burden of metalliferous values from said mixture, returning a quantity of the separated charcoal to the process, agitating a quantity of said separated mixture in the presence of additional charcoal for recovering values residual therein, separating charcoal therefrom, returning a quantity of said thus separated charcoal to the process at a point after said first separation step, and returning another quantity of said thus separated charcoal to the process at a point ahead of said first mentioned separation step.

9. In a process for the recovery of gold from its ores by cyanidation, the steps of agitating a pulp mixture derived from gold bearing ore, cyanide solution, and an alkali, with charcoal, while effecting a transfer of gold material from the pulp to the charcoal, separating charcoal with its burden of gold material from said pulp mixture, agitating a quantity of said separated pulp mixture in the presence of new added charcoal for recovering gold material residual therein, separating charcoal therefrom, and returning said thus separated charcoal to the process at any point in the process before the said new charcoal is added.

10. The method of treating gold bearing ore which comprises grinding the ore in the presence of cyanide solution, an alkali, and charcoal; classifying and thickening the ground ore into the form of pulp, thereafter agitating the thickened pulp by virtue of which gold is extracted from the ore by said cyanide solution and is concurrently adsorbed by said charcoal with the result that a cyanide solution substantially free of dissolved gold is maintained in contact with the ore, and separating the charcoal with its burden of adsorbed gold by froth flotation.

11. In a process for the recovery of metalliferous values from their ores by cyanidation, the steps of agitating a mixture of ore, cyanide solution, and charcoal, while effecting a transfer of metalliferous values from the ore to the charcoal, separating charcoal with its burden of metalliferous values from said mixture, returning a quantity of the separated charcoal to the process, agitating a quantity of said separated mixture in the presence of additional charcoal for recovering values residual therein, separating charcoal therefrom, returning a quantity of said thus-separated charcoal to the process at a point after said first separation step, and returning another quantity of said thus separated charcoal to the process at a point ahead of said first-mentioned separation step.

12. In a process for the recovery of metalliferous values from their ores by cyanidation, the steps of agitating a pulp mixture derived from ore, cyanide solution, and an alkali, with charcoal, while effecting a transfer of metalliferous values from the pulp to the charcoal, separating charcoal with its burden of metalliferous values from said pulp mixture, agitating a quantity of said separated pulp mixture in the presence of new added charcoal for recovering metalliferous values residual therein, separating charcoal therefrom, and returning said thus-separated charcoal to the process at any point in the process before the said new charcoal is added.

13. In a process for the recovery of gold from its ores by cyanidation, the steps of agitating a pulp mixture derived from ore, cyanide solution and an alkali, with charcoal, while effecting a transfer of the gold material from the pulp to the charcoal, separating charcoal with its burden of gold from said pulp mixture, agitating a quantity of the separated pulp mixture in the presence of newly added charcoal for recovering gold residual therein, and separating charcoal therefrom.

14. In a process for the recovery of metalliferous values from their ores by cyanidation, the steps of agitating a pulp mixture derived from ore, cyanide solution and an alkali, with charcoal, while effecting a transfer of metalliferous values from the pulp to the charcoal, separating charcoal with its burden of metalliferous values from said pulp mixture, agitating a quantity of the separated pulp mixture in the presence of newly added charcoal for recovering metalliferous values residual therein and separating the charcoal therefrom.

15. In the flotation of metal bearing charcoal from an ore pulp, said metal bearing charcoal resulting from the adsorption, absorption, or precipitation of metal from cyanide solutions by the charcoal, the step of adding to the tailing pulp resulting from the flotation of metal bearing charcoal from the pulp new charcoal whereby metal bearing charcoal residual in said tailing pulp is flushed, floated and recovered with the aid of the newly added charcoal.

16. The method of treating gold bearing ore which comprises effecting a mixture of said ore together with carbonaceous material, an alkali and cyanide solution, agitating said mixture by virtue of which gold is extracted from the ore by said cyanide solution and is concurrently adsorbed by said carbonaceous material with the result that a cyanide solution substantially free of dissolved gold is maintained in contact with said ore, and separating the carbonaceous material with its burden of adsorbed gold.

17. In a process for the recovery of gold from its ores by cyanidation, the steps of agitating a mixture of gold bearing ore, an alkali, cyanide solution and carbonaceous material, while effecting a transfer of gold material from the ore to the carbonaceous material, separating carbonaceous material with its burden of gold material from said mixture, agitating a quantity of said separated mixture in the presence of additional carbonaceous material for recovering gold material residual therein, separating carbonaceous material therefrom, and returning the thus separated carbonaceous material to the process at any point preceding the point of addition of said additional carbonaceous material.

18. In a process for recovering gold values from ores, tailings, and other gold bearing materials containing the same wherein the gold is dissolved by cyanide in a pulp containing the ore, alkali, and cyanide solution, the improvement which comprises adding carbonaceous material to the pulp at a stage prior to complete dissolution of the soluble gold whereby dissolved gold is accumulated by the carbonaceous matter and the cyanide solution thus substantially depleted of dissolved gold and whereby further dissolution of gold from the ore is accompanied by concurrent accumulation of gold by said carbonaceous material thus maintaining the gold content of the solution in a depleted condition during said concurrent dissolution and sorption.

THOMAS G. CHAPMAN.